United States Patent
Takechi et al.

(10) Patent No.: US 11,189,870 B2
(45) Date of Patent: Nov. 30, 2021

(54) LITHIUM AIR BATTERY

(71) Applicants: Toyota Motor Engineering & Manufacturing North America, Inc., Erlanger, KY (US); The Board of Trustees of the University of Illinois, Urbana, IL (US)

(72) Inventors: Kensuke Takechi, Ann Arbor, MI (US); Byoungsu Kim, Savoy, IL (US); Paul J. A. Kenis, Champaign, IL (US)

(73) Assignees: Toyota Motor Engineering & Manufacturing North America, Inc., Piano, TX (US); The Board of Trustees of the University of Illinois, Urbana, IL (US)

( * ) Notice: Subject to any disclaimer, the term of this patent is extended or adjusted under 35 U.S.C. 154(b) by 290 days.

(21) Appl. No.: 15/486,935

(22) Filed: Apr. 13, 2017

(65) Prior Publication Data
US 2018/0301776 A1    Oct. 18, 2018

(51) Int. Cl.
*H01M 12/08*    (2006.01)

(52) U.S. Cl.
CPC ............. *H01M 12/08* (2013.01); *Y02E 60/10* (2013.01)

(58) Field of Classification Search
CPC .................................................... H01M 12/08
See application file for complete search history.

(56) References Cited

U.S. PATENT DOCUMENTS

| | | | | |
|---|---|---|---|---|
| 2006/0166085 A1* | 7/2006 | Hennige | ................ | H01B 1/122 429/128 |
| 2010/0273032 A1* | 10/2010 | Kimishima | ................ | C08J 9/28 429/50 |
| 2010/0297491 A1* | 11/2010 | Ishihara | ................ | B01D 69/125 429/145 |
| 2013/0337348 A1* | 12/2013 | Zheng | .................... | H01M 2/40 429/405 |
| 2016/0013487 A1* | 1/2016 | Lee | ........................... | C09C 1/56 429/405 |

(Continued)

FOREIGN PATENT DOCUMENTS

KR    20140091247 A  *  7/2014

OTHER PUBLICATIONS

Park et al., KR-20140091247-A, English Machine Translation, pp. 1-24 (Year: 2014).*

(Continued)

*Primary Examiner* — Tae-Sik Kang
(74) *Attorney, Agent, or Firm* — Christopher G. Darrow; Darrow Mustafa PC

(57) ABSTRACT

A lithium-air flow battery has minimal cathodic product precipitation, thus extending capacity. The lithium-air flow battery includes a flow electrolyte, flowing proximal to the air cathode, the flow electrolyte having little to no intrinsic lithium ion content. Operation of the lithium-air flow battery generates a lithium-ion concentration gradient across the flow electrolyte, with the lowest lithium-ion concentration adjacent to the air cathode. The extremely low lithium-ion concentration at the cathode, combined with the flow condition at the cathode, results in a minimum of solid product accumulation at the cathode, enabling the cathode to catalyze oxygen reduction for an extended duration.

14 Claims, 3 Drawing Sheets

(56) References Cited

U.S. PATENT DOCUMENTS

2016/0036107 A1* 2/2016 Takechi .............. H01M 2/1646
  429/405
2017/0373311 A1* 12/2017 Salehi-Khojin ......... H01M 4/38

OTHER PUBLICATIONS

Grande, L. et al., Li/air Flow Battery Employing Ionic Liquid Electrolytes, Energy Technol., 4, pp. 85-89 (2016).
Prill, T. et al., Microstructure Modeling and Optimization of Transport Properties of Gas Diffusion Layers on PEM Fuel Cells, Combining Graph Based Approaches and Full Field Computations, Electrochem. Soc. Meeting Abstracts, 691, pp. 1-2, (2015).

* cited by examiner

LITHIUM AIR BATTERY

TECHNICAL FIELD

The present disclosure generally relates to lithium-air batteries and, more particularly, to lithium-air flow batteries.

BACKGROUND

The background description provided herein is for the purpose of generally presenting the context of the disclosure. Work of the presently named inventors, to the extent it may be described in this background section, as well as aspects of the description that may not otherwise qualify as prior art at the time of filing, are neither expressly nor impliedly admitted as prior art against the present technology.

Lithium-air batteries, including lithium-oxygen batteries, represent a potential advance over current commercial lithium-ion battery technologies. This is in part because Li-air batteries can have very high theoretical specific capacity of the discharge product (e.g., $_2$ 3038 Watt-hours per kilogram (W·h/kg) for $Li_2O_2$ vs. 600 W·h/kg for $Li_{0.5}CoO_2$). The high theoretical specific capacity is not achieved in practice, however, due to the poor solubility of discharge product and resultant "cathode clogging." Specifically, the capacity of the battery is substantially determined by the amount of discharge product (e.g. $Li_2O_2$) that the cathode (frequently a porous carbon cathode) is able to store. As $Li^+$ and $O_2$ react in the cathodic reaction, the resultant $Li_2O_2$ will tend to quickly precipitate at or near the cathode surface, clogging the cathode pores. This will tend to prevent additional $Li^+$ from being oxidized, and additional $Li_2O_2$ from penetrating the interior of the cathode. This not only presents a physical barrier blocking discharge product from reaching the largely unoccupied cathode interior, but also creates an insulative layer on the cathode surface that prevents further oxygen reduction. Thus capacity of the battery is severely compromised.

Efforts to overcome this problem by increasing surface area of the cathode have been largely unsuccessful.

Accordingly, it would be desirable to provide an improved Li-air battery design that overcomes the problems associated with discharge product precipitation.

SUMMARY

This section provides a general summary of the disclosure, and is not a comprehensive disclosure of its full scope or all of its features.

In various aspects, the present teachings provide a lithium-air flow electrochemical cell. The cell includes an anode; an air cathode in ionic communication with the anode, the cathode including a microporous layer; and a flow electrolyte in contact with the air cathode and configured to flow past the cathode. The flow electrolyte has an intrinsic lithium ion concentration of less than about 0.01 M.

In other aspects, the present teachings provide a method of minimizing cathodic product precipitation in a lithium-air flow battery, to improve capacity. The method includes a step of connecting an air cathode, having a microporous layer, to a flow chamber to form a cathodic chamber. The method further includes a step of filling the cathodic chamber with a flow electrolyte having an intrinsic lithium ion concentration less than 0.01 M. The method also includes a step of placing the air cathode in direct or indirect ionic communication with an anode via the flow electrolyte, to obtain a Li-air flow cell.

Further areas of applicability and various methods of enhancing the above coupling technology will become apparent from the description provided herein. The description and specific examples in this summary are intended for purposes of illustration only and are not intended to limit the scope of the present disclosure.

BRIEF DESCRIPTION OF THE DRAWINGS

The present teachings will become more fully understood from the detailed description and the accompanying drawings, wherein.

It should be noted that the figures set forth herein are intended to exemplify the general characteristics of the methods, algorithms, and devices among those of the present technology, for the purpose of the description of certain aspects. These figures may not precisely reflect the characteristics of any given aspect, and are not necessarily intended to define or limit specific embodiments within the scope of this technology. Further, certain aspects may incorporate features from a combination of figures.

DETAILED DESCRIPTION

The invention disclosure describes lithium-air (Li-air) flow batteries designed to overcome typical problems associated with cathodic precipitation of discharge product. Li-air batteries generally are hindered by accumulation of the solid product, $Li_2O_2$, on the porous cathode. This accumulation of the relatively non-conductive solid product effectively forms a passivation layer that significantly erodes battery performance over time. The Li-air flow battery of the present disclosure is designed to remove the solid product, via flow, from the vicinity of the cathode to prevent its accumulation on the cathode. This enables the battery to yield consistent discharge output for a longer time than prior art Li-air batteries.

One aspect of this design is that the electrolyte to which the cathode is exposed has very low $Li^+$ concentration. In particular embodiments, the electrolyte will be "$Li^+$-free" (i.e. the only source of $Li^+$ in the electrolyte will be $Li^+$ that is produced by oxidation at the anode). This feature keeps the rate of solid product formation at the cathode sufficiently low that the solid product can be removed by the flow condition without requiring an unacceptably high flow rate, such as would flood the cathode.

Figure 1A:
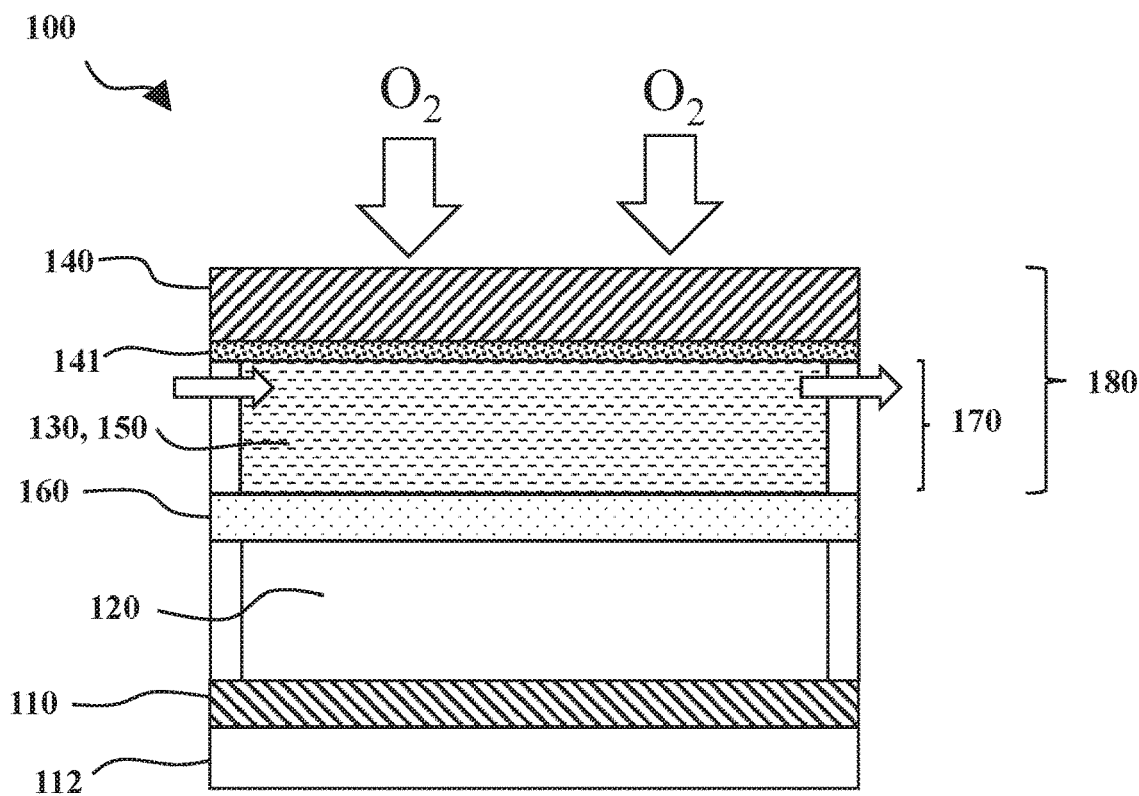
FIG. 1A is a schematic representation of a Li-air battery of the present disclosure, having a "2-room" structure.
Figure 1B:
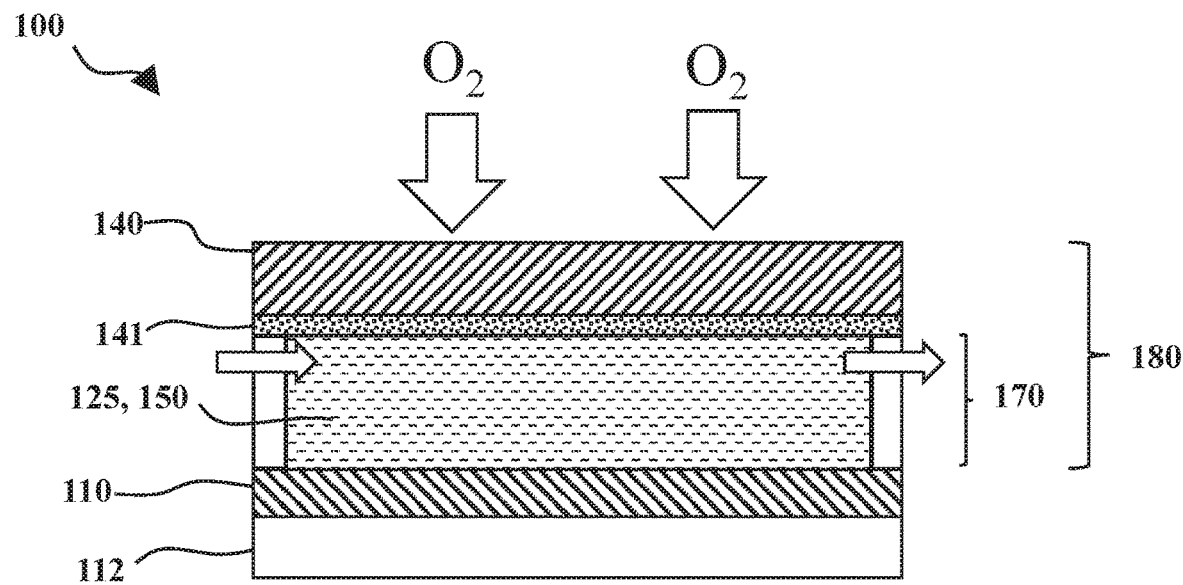
FIG. 1B is a schematic representation of a Li-air battery of the present disclosure, having a "1-room" structure.

Thus, and with reference to FIGS. 1A and 1B, a Li-air flow cell 100 is disclosed. The disclosed Li-air flow cell 100 can have an anode 110 in contact with an anodic current collector 112. The disclosed Li-air flow cell 100 can additionally have an air cathode 140 in ionic communication with the anode 110. The air cathode 140 includes a gas diffusion layer with microporous layer 141. The Li-air flow cell 100 can further have a flowing electrolyte 150 (hereinafter, a "flow electrolyte") in contact with the air cathode 140, the flow electrolyte 150 at least partly mediating ionic communication between the anode 110 and air cathode 140.

FIGS. 1A and 1B show two exemplary structures suitable for a Li-air flow cell 100 of the present disclosure. The structure of FIG. 1A, which can be termed a "2-room" structure, can include separate electrolytes: an anolyte 120 that is in contact with the anode 110; and a catholyte 130 that is in contact with the cathode 140. The anolyte 120 and catholyte 130 are separated by a solid-state Li-ion conductor 160; and the catholyte 130 in this implementation corresponds to the flow electrolyte 150. The structure of FIG. 1B, which can be termed a "1-room" structure, can include an electrolyte 125 that is in contact with the anode 110 and the air cathode 140. In such an implementation, the electrolyte 125 corresponds to the flow electrolyte 150.

As used herein, the term "anode" refers to a composition that, when at least partially charged, contains unoxidized lithium ("anodic lithium"). The anodic lithium is electrochemically oxidized during discharge of the Li-air flow cell 100. Suitable materials for the anode 110 can include lithium metal, reversible intercalating materials, such as graphite, or any other suitable lithium anode material.

As used herein, the term "air cathode" refers to a composition that is at least partially permeable to oxygen gas, and capable of mediating electrochemical reduction of oxygen in the presence of $Li^+$ during discharge of the Li-air flow cell 100. Typically, the air cathode 140 will include a gas diffusion layer in which oxygen and the flow electrolyte 150 come into contact during operation of the Li-air flow cell 100. The gas diffusion layer can provide control over diffusion-based mass transport, as well as control over diffusion of the flow electrolyte 150. In many implementations, the gas diffusion layer will include a carbon fiber substrate for structural support, and a microporous layer 141 that provides high surface tension at the liquid-gas-solid interface (i.e. the interface between flow electrolyte 150; oxygen; and cathode) in order to maintain the structural integrity and position of the liquid-gas interface. In certain embodiments, and air cathode 140 can include any kind of electron conducting electrode that is at least partially gas permeable, for example porous carbon or metals. In certain implementations, the air cathode can include carbon fiber that is hydrophobized with polymer coating, such as PTFE or PDVF.

With reference to FIGS. 1A and 1B, it will be appreciated that the flow electrolyte 150 resides in, and during operation flows through, a flow chamber 170. In the 2-room example of FIG. 1A, the periphery of the flow chamber 170 is defined by edges of the air cathode 140, side walls (not labeled), and the solid-state lithium ion conductor 160. In the 1-room example of FIG. 1B, the periphery of the flow chamber 170 is defined by edges of the air cathode 140, side walls, and the anode 110. The flow condition of the flow electrolyte is represented by horizontal block arrows, which can correspond to an inlet and an outlet in the side walls. It is to be appreciated that side walls need not necessarily be present. A flow chamber 170 with the air cathode 140 attached can be referred to as a cathodic chamber 180.

The flow electrolyte 150 will generally be in a flow condition relative to the air cathode 140 during operation (discharge) of the Li-air flow cell 100. Thus, for example, the flow electrolyte 150 may be part of a flow circuit, having a reservoir of flow electrolyte 150 external to the cell 100, and a pump that causes flow electrolyte 150 to flow past the cathode 140 at a desired rate.

The flow electrolyte 150 can be understood to have an intrinsic lithium ion concentration, that excludes lithium content resulting from battery discharge, and an operational lithium ion concentration that includes lithium content resulting from battery discharge. Thus, as used herein, the phrase "intrinsic lithium ion concentration" can refer to the lithium ion concentration of the flow electrolyte 150, excluding lithium ion content derived from the anode 110 and/or the anolyte. It will be understood that during battery discharge, lithium ions derived from electrochemical oxidation of the anode 110 will enter the electrolyte 130, in the case of a 1-room structure such as in FIG. 1B. Similarly, in the case of a 2-room structure according to FIG. 1A, it will be understood that during battery discharge, lithium ions will pass from the anolyte 120, across the solid state lithium ion conductor, into the catholyte 130. It will be understood that such lithium ions can originate from the anode 110 and/or the anolyte 120.

Alternatively or in addition, the phrase "intrinsic lithium ion concentration" can refer to the lithium ion concentration of the flow electrolyte 150 when the cell 100 is fully charged. Alternatively, or in addition, the phrase "intrinsic lithium ion concentration" can refer to the lithium ion concentration of the flow electrolyte 150 prior to a first discharge of the cell 100. In implementations in which the flow electrolyte 150 is part of a flow circuit having a reservoir of flow electrolyte located external to the cell 100, the "intrinsic lithium ion concentration" can be regarded as being substantially identical to the lithium ion concentration of the flow electrolyte 150 contained in the reservoir. In general, the "operational lithium ion concentration" can be defined as the lithium ion concentration in the flow electrolyte 150, within the cell 100 and during discharge of the cell 100.

Of importance, the flow electrolyte 150 will generally have very low intrinsic lithium ion concentration. In some implementations, the intrinsic lithium ion concentration of the flow electrolyte 150 will be less than 0.1 M, or less than 0.01 M, or less than 0.001 M. In many implementations, the flow electrolyte 150 will be substantially free of lithium ion, i.e. having an intrinsic lithium ion concentration of zero.

Figure 2:
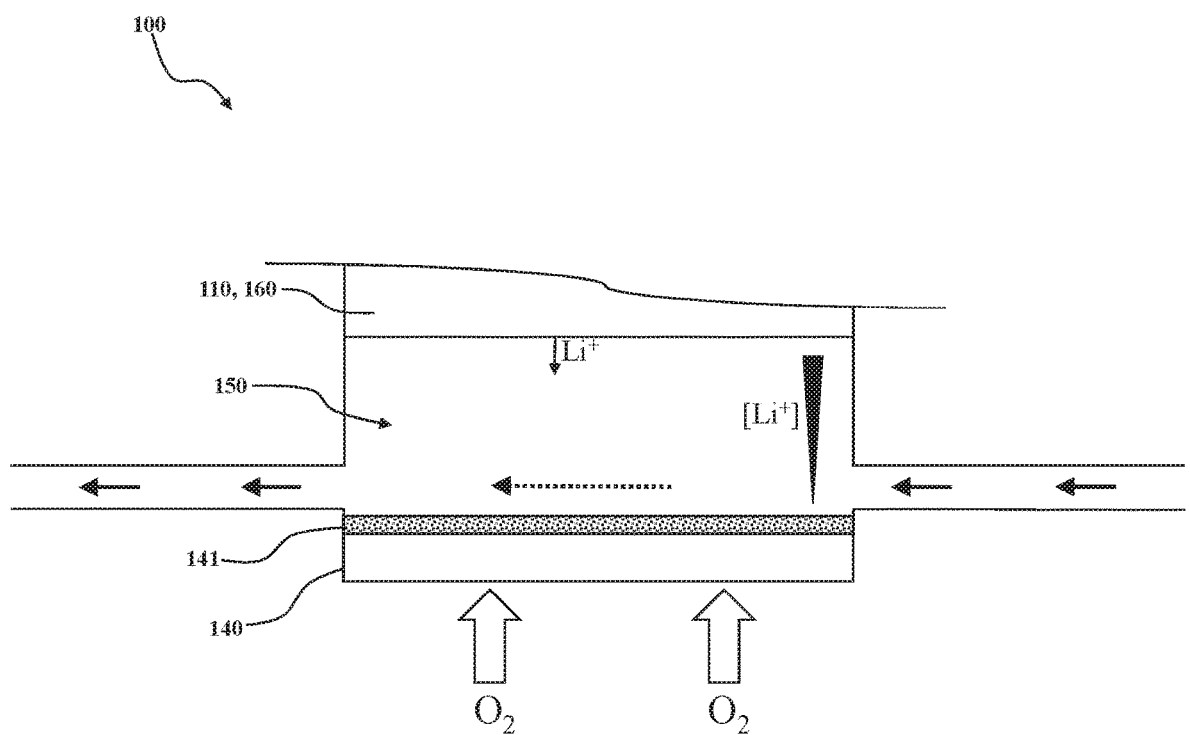
FIG. 2 is a schematic representation of the Li-air battery of either FIG. 1A or FIG. 1B, and illustrating a lithium ion concentration gradient caused by the flow condition and low intrinsic lithium ion concentration of the flow electrolyte.

With reference now to FIG. 2, it will thus be appreciated that the operational lithium ion concentration of the flow electrolyte 150 will include a concentration gradient in many implementations, with a lower concentration proximal to the surface of the cathode 140, and a higher concentration proximal to the solid state lithium ion conductor 160, in the case of a 2-room cell, or proximal to the anode 110, in the case of a 1-room cell. Such a gradient will be present during cell operation when the intrinsic lithium ion concentration of the flow electrolyte 150 is very low, such that lithium ions in the flow electrolyte 150 are derived substantially or entirely from a source on one side at the anode 110/anolyte 120 as discussed above, and consumed at the opposite side at the cathode 140.

Such a lithium ion concentration gradient in the flow electrolyte 150 during cell operation may be accentuated (i.e. the gradient may be made steeper) by the flow condition of the flow electrolyte 150. This will particularly be the case when the flow rate of the flow electrolyte 150 is relatively high proximal to the cathode 140. Thus, due to the very low intrinsic lithium ion concentration of the flow electrolyte 150, as well as the flow condition of the flow electrolyte 150, the lithium ion concentration at the cathode 140 will be low during cell 100 operation. This can result in a relatively low rate of formation of discharge product (e.g. $Li_2O_2$). It will be appreciated that the low rate of formation of discharge product, combined with the flow condition of the flow electrolyte 150, can minimize precipitation of discharge product at the cathode 140, thus improving performance, particularly energy density of the cell 100.

It is to be understood that in many implementations, particularly implementations in which the concentration of lithium ions proximal to the air cathode is very low, the majority of product formation need not occur directly at the air cathode 140, but can instead occur in the flow electrolyte 150. In such implementations, $O_2$ will be reduced at the air cathode 150 to superoxide radical ($O_2^-$). Superoxide radical formed at the air cathode 150 can then dissolve in, and diffuse within, the flow electrolyte 150, where it will encounter lithium ions. Superoxide radical can then oxidize lithium ions within the flow electrolyte 150, facilitating removal of the resulting product (e.g. $Li_2O_2$) from the flow chamber 170 due to the flow condition. It will be appreciated that implementations in which dissolved superoxide radical reacts with dissolved lithium ions in the flow electrolyte 150 can be facilitated by the use of a flow electrolyte 150 capable of stabilizing dissolved superoxide radical, such as DEME-TFSI, or other ionic liquid.

It will thus be understood that in implementations of the Li-air flow battery 100 that have a 2-room structure as exemplified in FIG. 1A, the anolyte 120 can include one or more lithium salts or lithium ion electrolytes that are stable against an $Li/Li^+$ redox potential. Suitable examples can include, without limitation: Bis(trifluoromethane)sulfonimide lithium (LiTFSA) and other fluoroalkylimido lithium salts, other organic lithium salts, inorganic lithium salts such as $LiPF_6$; or any other electrochemically compatible lithium salt.

It will be understood that a potential difficulty of operating a Li-air flow cell 100 of the present disclosure is the possibility of flooding the cathode 140. In effect, because the cathode 140 is open to ambient air (or $O_2$), the flow condition of the flow electrolyte 150 can cause the flow electrolyte 150 to penetrate the entire cathode 140, including the microporous layer 141, thus displacing air and eliminating the liquid-gas-solid interface necessary for cathodic reduction of oxygen and cell 100 discharge. One approach that can be taken to prevent such flooding of the cathode 140 is to determine a porosity of the microporous layer 141 that is sufficiently restrictive (i.e. average pore size small enough) to prevent the flow electrolyte 150 from penetrating the entire cathode 140, while still allowing adequate diffusion of oxygen and flow electrolyte 150 within the cathode 140.

Figure 3:
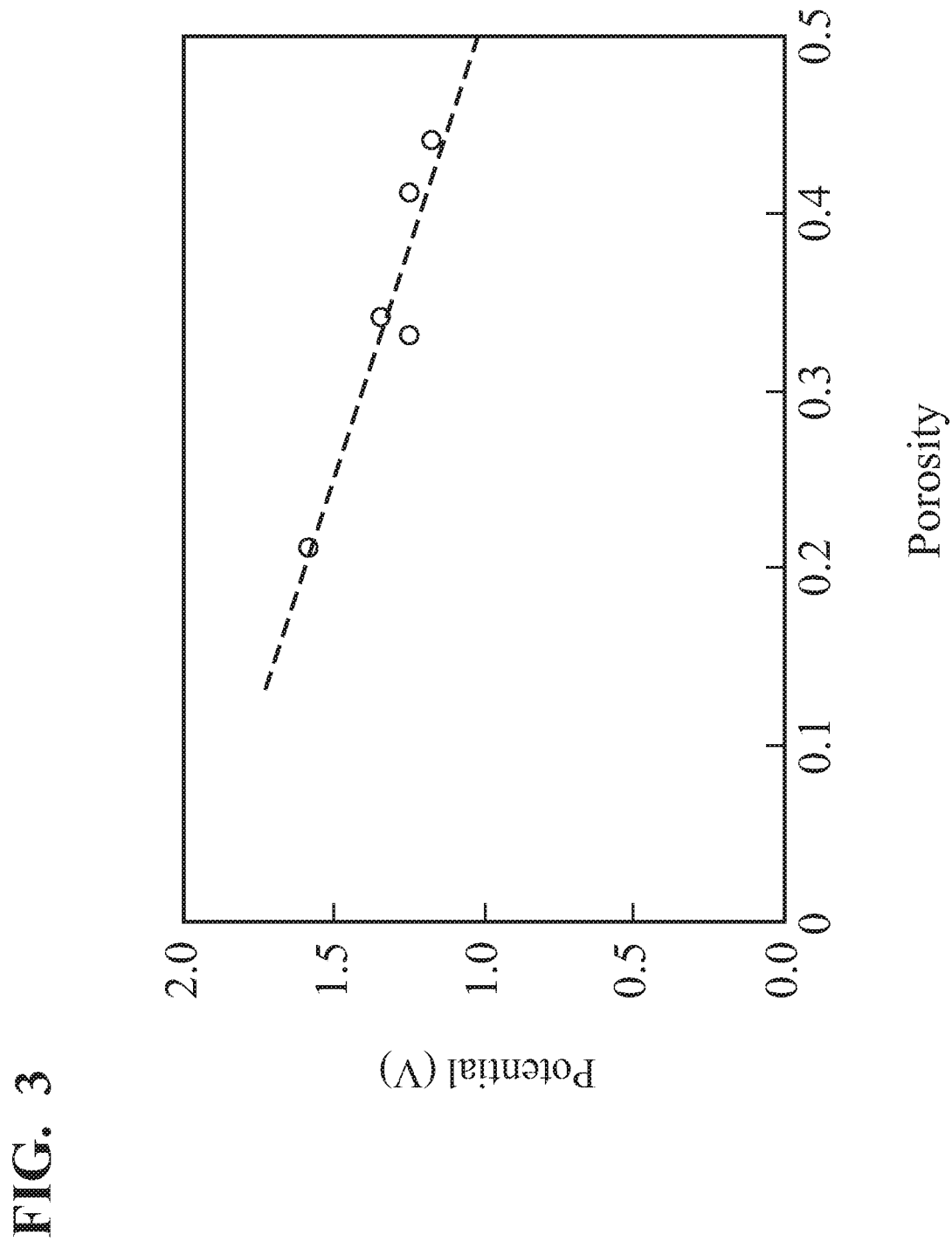
FIG. 3 is a plot of discharge electric potential as a function of cathode porosity for a series of Li-air batteries of the present disclosure.

FIG. 3 shows a determination of a porosity range of the microporous layer 141 of the air cathode 140, to avoid cathode 140 flooding and ensure efficient, continuous operation of the Li-air flow cell 100. As shown in FIG. 2, Li-air flow cells 100 in which the cathode 140 has a microporous layer 141 with a porosity less than 0.4 perform more efficiently than otherwise equivalent cells in which the porosity is 0.44.

Also disclosed is a method for 1 minimizing cathodic product precipitation in a lithium-air flow battery, to improve capacity. The method includes a step of connecting an air cathode 140, having a microporous layer 141, to a flow chamber 170 to form a cathodic chamber 180. The method further includes a step of filling the cathodic chamber 180 with a flow electrolyte 150 having an intrinsic lithium ion concentration less than 0.01 M. The method further includes a step of placing the air cathode 140 in direct or indirect ionic communication with an anode 110 via the flow electrolyte 150, to obtain a Li-air flow cell 100.

As used here, the phrase "direct ionic communication" refers implementations in which the flow electrolyte 150 directly contacts both the air cathode 140 and the anode 110, such as shown in FIG. 1B. The phrase "indirect ionic communication" refers to implementations in which other materials, such as the anolyte 125 and the solid-state lithium ion conductor 160, are used in combination with the flow electrolyte 150 to achieve ionic communication between the air cathode 140 and the anode 110, as shown in FIG. 1A. The anode 110 can be connected to the flow chamber 170 in order to achieve direct ionic communication between the anode 110 and the cathode 140, mediated by the flow electrolyte 150. An anode chamber, including the solid-state lithium ion conductor 160, the anode 110, and anolyte 125 can be can be connected to the flow chamber 170 in order to achieve indirect ionic communication between the anode 110 and the cathode 140, mediated by the flow electrolyte 150.

The method can further include a step of discharging the Li-air flow cell 100 to generate a concentration gradient between a higher $[Li^+]$ region and a lower $[Li^+]$ region, as shown above in FIG. 2. As discussed above, the higher $[Li^+]$ region will be proximal to the solid-state Li-ion conductor 160 or proximal to the anode 110. In some implementations, lithium ion concentration at the higher $[Li^+]$ concentration region can be equal to at least 10×, or 100×, or 1000× the lithium ion concentration at the lower [Li+] region.

The present invention is further illustrated with respect to the following examples. It needs to be understood that these examples are provided to illustrate specific embodiments of the present invention and should not be construed as limiting the scope of the present invention.

Examples. Construction and Electrochemical Testing of Exemplary Li-Air Flow Batteries Having Varying Porosity in the Microporous Layer Five separate Li-air flow cells 100 are constructed, having a 2-room structure as shown schematically in FIG. 1A. In each case: the anode 110 is 0.25 mm thick lithium foil (FMC Corp.); the anolyte 120 is 1.0 M LiTFSA in propylene carbonate (Kishida Chemical); the solid-state Li-ion conductor is 1 mm thick Lithium-Ion Conducting Glass-Ceramic (LIC-GC—OHARA Corp.); catholyte 130 (corresponding to flow electrolyte 150) is N,N-diethyl-N-methyl-N-(2-methoxyethyl)ammonium bis(trifluoromethylsulfonyl)amide (DEME/TFSA; Kanto Corp.); the cathode is Sigracet 35 BC (SGL Group); and the distance from the solid-state lithium ion conductor to the cathode 140 is 5 mm. Porosity of the microporous layer is modified by hot pressing the Sigracet 35 BC at 125° C. at varying loads.

During electrochemical testing, dried air (relative humidity: 1-2%) is supplied at the cathode 140 at a flow rate of 10 sccm. Flow rate of catholyte 130 (corresponding to flow electrolyte 150) is 0.5 mL/min, and the evaluation temperature is 25° C.

Cell 100 performance is evaluated by monitoring battery voltage 30 minutes after starting constant current discharge (0.31 $mA/cm^2$). FIG. 3 shows the monitored voltage of the batteries with differing porosity of the microporous layer of the cathode 140. The results in FIG. 3 indicate that when the porosity of the microporous layer is less than 0.4, the cell 100 exhibits higher electric potential as compared to the cell in which porosity of the microporous layer is 0.44. More generally, an inverse relationship between porosity and electric potential is evident within the examined range.

The preceding description is merely illustrative in nature and is in no way intended to limit the disclosure, its application, or uses. As used herein, the phrase at least one of A, B, and C should be construed to mean a logical (A or B or C), using a non-exclusive logical "or." It should be understood that the various steps within a method may be executed in different order without altering the principles of the present disclosure. Disclosure of ranges includes disclosure of all ranges and subdivided ranges within the entire range.

The headings (such as "Background" and "Summary") and sub-headings used herein are intended only for general organization of topics within the present disclosure, and are not intended to limit the disclosure of the technology or any aspect thereof. The recitation of multiple embodiments having stated features is not intended to exclude other embodiments having additional features, or other embodiments incorporating different combinations of the stated features.

As used herein, the terms "comprise" and "include" and their variants are intended to be non-limiting, such that recitation of items in succession or a list is not to the exclusion of other like items that may also be useful in the devices and methods of this technology. Similarly, the terms "can" and "may" and their variants are intended to be non-limiting, such that recitation that an embodiment can or may comprise certain elements or features does not exclude other embodiments of the present technology that do not contain those elements or features.

The broad teachings of the present disclosure can be implemented in a variety of forms. Therefore, while this disclosure includes particular examples, the true scope of the disclosure should not be so limited since other modifications will become apparent to the skilled practitioner upon a study of the specification and the following claims. Reference herein to one aspect, or various aspects means that a particular feature, structure, or characteristic described in connection with an embodiment or particular system is included in at least one embodiment or aspect. The appearances of the phrase "in one aspect" (or variations thereof) are not necessarily referring to the same aspect or embodiment. It should be also understood that the various method steps discussed herein do not have to be carried out in the same order as depicted, and not each method step is required in each aspect or embodiment.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations should not be regarded as a departure from the disclosure, and all such modifications are intended to be included within the scope of the disclosure.

What is claimed is:

1. A lithium-air flow electrochemical cell, comprising:
   an anode;
   an air cathode in ionic communication with the anode;
   a microporous layer in direct contact with the air cathode; and
   a flow electrolyte in direct contact with the microporous layer and configured to flow past the microporous layer, the flow electrolyte having an ionic liquid and an intrinsic lithium ion concentration of less than about 0.001 M.

2. The lithium-air flow electrochemical cell as recited in claim 1, comprising a two-room cell.

3. The lithium-air flow electrochemical cell as recited in claim 1, comprising a 1-room cell.

4. The lithium-air flow electrochemical cell as recited in claim 1, wherein the microporous layer has a porosity of less than about 0.4.

5. A method of minimizing cathodic product precipitation in a lithium-air flow battery, to improve capacity, the method comprising:
   connecting an air cathode to a flow chamber to form a cathodic chamber, wherein the air cathode is in direct contact with a microporous layer;
   filling the cathodic chamber with a flow electrolyte having an ionic liquid and an intrinsic lithium ion concentration less than 0.001 M, such that the flow electrolyte is in direct contact with the microporous layer, the flow electrolyte configured to flow past the microporous layer; and
   placing the air cathode in direct or indirect ionic communication with an anode via the flow electrolyte, to obtain a Li-air flow cell.

6. The method as recited in claim 5, comprising filling the cathodic chamber with a flow electrolyte having an intrinsic lithium ion concentration of zero.

7. The method as recited in claim 5, comprising placing the air cathode in indirect ionic communication with the anode, by connecting the anode to the flow chamber thereby forming a 1-room cell.

8. The method as recited in claim 5, comprising placing the air cathode in indirect ionic communication with the anode, by connecting an anode chamber to the flow chamber, thereby forming a 2-room cell, the anode chamber comprising:
   a solid-state lithium ion conductor;
   the anode; and
   an anolyte.

9. The method as recited in claim 5, comprising connecting an air cathode, having a microporous layer, wherein the microporous layer having a porosity of less than about 0.4, to the flow chamber to form a cathodic chamber.

10. The method as recited in claim 5, comprising discharging the Li-air flow cell to generate a concentration gradient between a higher [$Li^+$] region and a lower [$Li^+$] region.

11. The method as recited in claim 5, comprising discharging the Li-air flow cell to generate a concentration gradient between a higher [$Li^+$] region and a lower [$Li^+$] region, the higher [$Li^+$] region having a lithium ion concentration equal to at least 10 times that of the lower [$Li^+$] region.

12. The method as recited in claim 5, comprising discharging the Li-air flow cell to generate a concentration gradient between a higher [$Li^+$] region and a lower [$Li^+$] region, the higher [$Li^+$] region having a lithium ion concentration equal to at least 100 times that of the lower [$Li^+$] region.

13. The method as recited in claim 5, comprising discharging the Li-air flow cell to generate a concentration gradient between a higher [$Li^+$] region and a lower [$Li^+$] region, the higher [$Li^+$] region having a lithium ion concentration equal to at least 1000 times that of the lower [$Li^+$] region.

14. A lithium-air flow electrochemical cell, comprising:
an anode;
an air cathode in ionic communication with the anode;
a microporous layer in direct contact with the air cathode; and
a flow electrolyte in direct contact with the microporous layer and configured to flow past the microporous layer, the flow electrolyte having an ionic liquid and no intrinsic lithium ion content.

* * * * *